United States Patent
Wang et al.

(10) Patent No.: US 9,698,930 B2
(45) Date of Patent: Jul. 4, 2017

(54) BANDWIDTH MAP UPDATE METHOD AND DEVICE

(71) Applicant: ZTE CORPORATION, Shenzhen, Guangdong Province (CN)

(72) Inventors: Lei Wang, Shenzhen (CN); Fen Yan, Shenzhen (CN); Sheping Shi, Shenzhen (CN); Zhiliang Ren, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/912,930

(22) PCT Filed: Jun. 16, 2014

(86) PCT No.: PCT/CN2014/079966
§ 371 (c)(1),
(2) Date: Feb. 19, 2016

(87) PCT Pub. No.: WO2014/180447
PCT Pub. Date: Nov. 13, 2014

(65) Prior Publication Data
US 2016/0197699 A1    Jul. 7, 2016

(30) Foreign Application Priority Data

Aug. 20, 2013  (CN) .......................... 2013 1 0365467

(51) Int. Cl.
*H04J 14/02* (2006.01)
*H04Q 11/00* (2006.01)

(52) U.S. Cl.
CPC ........ *H04J 14/0227* (2013.01); *H04J 14/022* (2013.01); *H04J 14/0256* (2013.01);
(Continued)

(58) Field of Classification Search
USPC .......................................................... 398/47
See application file for complete search history.

(56) References Cited

U.S. PATENT DOCUMENTS 6,556,548 B1 * 4/2003 Kirkby ................ H04L 12/5695
370/322
2004/0037301 A1 * 2/2004 Shachar .................. H04L 12/43
370/404

(Continued)

FOREIGN PATENT DOCUMENTS

| CN | 101656894 A | 2/2010 |
| CN | 101895367 A | 11/2010 |
| CN | 102025478 A | 4/2011 |

OTHER PUBLICATIONS

A Study on Dynamic Load Balanced Routing Techniques in Time-Slotted Optical Burst Switched Networks; Liang Ou et al, Huazhong University of Science and Technology, Wuhan, Hubei, China. XP0019016522A.

(Continued)

*Primary Examiner* — David Payne
*Assistant Examiner* — Omar S Ismail
(74) *Attorney, Agent, or Firm* — Ling Wu; Stephen Yang; Ling and Yang Intellectual Property

(57) ABSTRACT

A method for bandwidth map update includes: after receiving a bandwidth report carried by a control frame, a master node newly establishing a bandwidth map, newly establishing a resource state table, and setting all resource states in the newly established resource state table to be available; adding a cross-master node transport channel drop allocation structure of the newly established bandwidth map in accordance with a cross-master node transport channel add allocation structure of a bandwidth map to be updated, and updating the resource state table; according to the bandwidth report carried by the control frame, allocating a wavelength and an optical burst timeslot one by one to a current bandwidth request, adding wavelengths and optical burst timeslots to the newly established bandwidth map, generating a new bandwidth map, and updating the resource state (Continued)

table; and distributing the control frame carrying the new bandwidth map to slave nodes hop by hop.

18 Claims, 13 Drawing Sheets

(52) U.S. Cl.
CPC ...... *H04J 14/0269* (2013.01); *H04J 14/0273* (2013.01); *H04J 14/0283* (2013.01); *H04Q 11/0066* (2013.01); *H04Q 2011/0064* (2013.01); *H04Q 2011/0086* (2013.01); *H04Q 2011/0092* (2013.01)

(56) References Cited

U.S. PATENT DOCUMENTS

| | | | |
|---|---|---|---|
| 2004/0042796 A1* | 3/2004 | Con-Carolis | H04J 14/0227 398/83 |
| 2010/0149967 A1* | 6/2010 | Johansen | H04L 45/00 370/225 |

OTHER PUBLICATIONS

A Novel Optical Burst Ring Network with Optical-Layer Aggregation and Flexible Bandwidth Provisioning; Ning Deng et al. Huawei Technologies Co., Ltd., XP31946433A.

Design and implementation of high-speed BCP processor for OBS core node based on FPGA. Tauran Zhang et al. Shanghai Jiao tong University. XP31709506A.

\* cited by examiner

| Transmitter serial number | 1 | 2 | 3 | 4 | 5 | 6 | 7 | 8 | 9 | 10 |
|---|---|---|---|---|---|---|---|---|---|---|
| A | 1 | 0 | 0 | 0 | 0 | 0 | 0 | 1 | 1 | 1 | 1 |
| B | 1 | 0 | 0 | 0 | 0 | 0 | 0 | 1 | 1 | 1 | 1 |
| C | 1 | 0 | 0 | 0 | 1 | 0 | 1 | 1 | 1 | 1 | 1 |
| D | 1 | 0 | 0 | 0 | 0 | 0 | 0 | 1 | 1 | 1 | 1 |

| Receiver serial number | 1 | 2 | 3 | 4 | 5 | 6 | 7 | 8 | 9 | 10 |
|---|---|---|---|---|---|---|---|---|---|---|
| A | 1 | 0 | 0 | 0 | 0 | 0 | 0 | 1 | 1 | 1 | 1 |
| B | 1 | 0 | 0 | 0 | 0 | 0 | 0 | 1 | 1 | 1 | 1 |
| C | 1 | 1 | 0 | 0 | 0 | 0 | 0 | 1 | 1 | 1 | 1 |
| D | 1 | 0 | 0 | 0 | 0 | 0 | 0 | 1 | 1 | 1 | 1 |

FIG. 3

$\lambda_1$

|  | 1 | 2 | 3 | 4 | 5 | 6 | 7 | 8 | 9 | 10 |
|---|---|---|---|---|---|---|---|---|---|---|
| AB | 0 | 0 | 0 | 0 | 0 | 0 | 1 | 1 | 1 | 1 |
| BC | 0 | 0 | 0 | 0 | 0 | 0 | 1 | 1 | 1 | 1 |
| CD | 0 | 0 | 0 | 0 | 0 | 0 | 1 | 1 | 1 | 1 |
| DA | 0 | 0 | 0 | 0 | 0 | 0 | 1 | 1 | 1 | 1 |

$\lambda_2$

|  | 1 | 2 | 3 | 4 | 5 | 6 | 7 | 8 | 9 | 10 |
|---|---|---|---|---|---|---|---|---|---|---|
| AB | 1 | 0 | 0 | 0 | 0 | 0 | 1 | 1 | 1 | 1 |
| BC | 1 | 0 | 0 | 0 | 0 | 0 | 1 | 1 | 1 | 1 |
| CD | 0 | 0 | 0 | 1 | 0 | 1 | 1 | 1 | 1 | 1 |
| DA | 0 | 0 | 0 | 1 | 0 | 1 | 1 | 1 | 1 | 1 |

FIG. 4

| Routing serial number | AB | BC | CD | DA |
|---|---|---|---|---|
| A→B | 1 | 1 | 0 | 0 | 0 |
| A→C | 1 | 1 | 1 | 0 | 0 |
| A→D | 1 | 1 | 1 | 1 | 0 |
| B→C | 1 | 0 | 1 | 0 | 0 |
| B→D | 1 | 0 | 1 | 1 | 0 |
| B→A | 1 | 0 | 1 | 1 | 1 |
| C→D | 1 | 0 | 0 | 1 | 0 |
| C→A | 1 | 0 | 0 | 1 | 1 |
| C→B | 1 | 1 | 0 | 1 | 1 |
| D→A | 1 | 0 | 0 | 0 | 1 |
| D→B | 1 | 1 | 0 | 0 | 1 |
| D→C | 1 | 1 | 1 | 0 | 1 |

FIG. 5

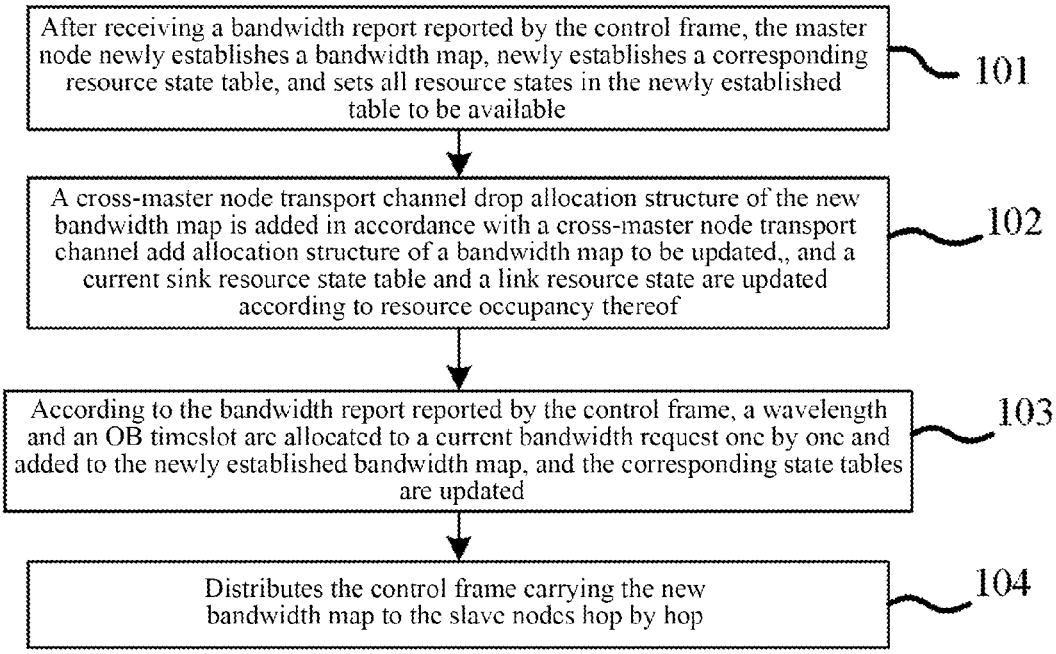

101 — After receiving a bandwidth report reported by the control frame, the master node newly establishes a bandwidth map, newly establishes a corresponding resource state table, and sets all resource states in the newly established table to be available 102 — A cross-master node transport channel drop allocation structure of the new bandwidth map is added in accordance with a cross-master node transport channel add allocation structure of a bandwidth map to be updated, and a current sink resource state table and a link resource state are updated according to resource occupancy thereof 103 — According to the bandwidth report reported by the control frame, a wavelength and an OB timeslot are allocated to a current bandwidth request one by one and added to the newly established bandwidth map, and the corresponding state tables are updated 104 — Distributes the control frame carrying the new bandwidth map to the slave nodes hop by hop

| BTC overhead | The number of OBs | The number of wavelengths | The number of bandwidth reports | CRC check | (Sink) node ID | Add identification | Drop identification | Other overheads | Wavelength ID 1 | The number of OBs 1 | OB timeslot allocation 1 | Wavelength ID 2 | The number of OBs 2 | OB timeslot allocation 2 | Bandwidth report |
|---|---|---|---|---|---|---|---|---|---|---|---|---|---|---|---|
| | | | | | | | | Object coding of the bandwidth map of the control frame (master node) | | | | | | | |
| A→B | 4 | 2 | 0 | ... | B | 1 | 1 | ... | 1 | 3 | 0x0029 | 2 | 1 | 0x0010 | |
| A→C | 1 | 1 | 0 | ... | C | 1 | 1 | ... | 1 | 1 | 0x0002 | | | | |
| A→D | 1 | 1 | 0 | ... | D | 1 | 1 | ... | 1 | 1 | 0x0004 | | | | |
| B→C | 1 | 1 | 0 | ... | C | 1 | 1 | ... | 2 | 1 | 0x0004 | | | | |
| B→D | 2 | 1 | 0 | ... | D | 1 | 1 | ... | 1 | 2 | 0x0028 | | | | |
| B→A | 3 | 2 | 0 | ... | A | 1 | 1 | ... | 1 | 1 | 0x0001 | 2 | 2 | 0x0012 | |
| C→D | 3 | 2 | 0 | ... | D | 1 | 1 | ... | 1 | 2 | 0x0012 | 2 | 1 | 0x0001 | |
| C→B Add | 1 | 1 | 0 | ... | B | 1 | 0 | ... | 2 | 1 | 0x0004 | | | | |
| C→B Drop | 1 | 1 | 0 | ... | B | 0 | 1 | ... | 2 | 1 | 0x0002 | | | | |
| D→A | 3 | 1 | 0 | ... | A | 1 | 1 | ... | 1 | 3 | 0x002c | | | | |
| D→B Add | 1 | 1 | 0 | ... | B | 1 | 0 | ... | 1 | 1 | 0x0002 | | | | |
| D→C Add | 2 | 2 | 0 | ... | C | 1 | 0 | ... | 1 | 1 | 0x0010 | 2 | 1 | 0x0001 | |
| D→B Drop | 1 | 1 | 0 | ... | B | 0 | 1 | ... | 2 | 1 | 0x0004 | | | | |
| D→C Drop | 3 | 2 | 0 | ... | C | 0 | 1 | ... | 1 | 1 | 0x0010 | 2 | 2 | 0x0028 | |

FIG. 9d

BANDWIDTH MAP UPDATE METHOD AND DEVICE

TECHNICAL FIELD

The present document relates to the technical field of optical network, and more particularly, to a method and device for wavelength and timeslot allocation and bandwidth map update for a sub-wavelength all-optical switching network namely for an Optical Burst Transport Network (OBTN).

BACKGROUND OF THE RELATED ART

The global data traffics increase explosively, and newly-emerging services represented by video and streaming media services develop rapidly, so that dynamic, high-bandwidth and high-quality requirement data services become the main body of network traffics and drive the network to evolve towards the packetization. On an aspect of a transport network, it can be seen that it is exactly the result of the development of network traffic datamation that the development is from a traditional Synchronous Digital Hierarchy (SDH) circuit switching network to a Multi-Service Transfer Platform based on the SDH (MSTP) with multi-service access functions and the gradual evolution is to a Packet Transport Network (PTN) nowadays. Fundamentally, the circuit switching network can only provide the rigid pipeline and coarse-grained switching and cannot effectively meet the requirements of dynamism and burstiness of the data services, but the flexible pipeline and statistical multiplexing feature of the packet switching network are naturally adapted to the data services. However, the current packet switching is basically processed based on the electronic layer, the cost and enemy consumption are high, and with the rapid growth of the traffics, the processing bottleneck of the current packet switching is increasingly prominent, which is difficult to adapt to the high-speed, flexible, low-cost and low-energy requirements of the future networks. The optical network has an advantage of low cost, low energy consumption and high speed and large capacity, but the traditional optical circuit switching networks (such as Wavelength Division Multiplexing (WDM) and an Optical Transport Network (OTN)) can only provide the large-grained grid pipeline, which is short of the flexibility of the circuit packet switching and cannot effectively bear the data services.

In the access network, the Gigabit-Capable Passive Optical Network (GPON) technology combines the advantages of the optical layer and the electronic layer to a certain extent. In a downlink direction, the GPON technology, by means of optical layer broadcast, distributes a downlink signal sent by an Optical Line Terminal (OLT) to each Optical Network Unit (GNU) via an optical divider, and meanwhile, a bandwidth map of an uplink frame is carried in a downlink frame header, to indicate the sending time and length of the uplink data of each ONU; in an uplink direction, each ONU sends the data according to an indication of the bandwidth map, and multiplexes the data to one wavelength path via an optical coupler and uploads the data to the OLT. Therefore, the GPON possesses the characteristics of high speed and large capacity and low cost of the optical layer on one hand, and implements the optical-layer statistical multiplexing of the multi-channel data in the uplink direction on the other hand, which improves the flexibility and the bandwidth utilization. The GPON normally uses the star/tree networking topology, and a working principle thereof is suitable to bearing the multipoint-to-single point converged traffics (the north-south traffics predominate), thus the successful application and large-scale deployment are achieved in the access network.

However, with respect to non-converged application scenarios, such as a metro area core network and a data center internal switching network, the east-west oriented traffics account for a large proportion and even occupy a leading position, thus the GPON technology is apparently unsuitable (the east-west oriented traffics need to be forwarded by the electronic layer of the OLT, and the capacity of the GPON is limited). The Optical Burst Transport Network (OBTN) adopts the all-optical switching technology based on the Optical Burst (OB), and possesses the ability of optical layer bandwidth on demand and fast scheduling between arbitrary network node pairs, which can realize the dynamic adaptation and good support to various traffic scenarios (such as north-south oriented burst traffics and east-west oriented burst traffics, etc.), enhance the resource utilization efficiency and network flexibility, maintain the advantages of high speed and large capacity and low cost of the optical layer in the meantime, and be applicable to various star/tree/ring network topologies. FIG. 1 is a schematic diagram of a 4-node OBTN unidirectional ring network, wherein, each node is configured with a pair of fast tunable burst mode transmitter and fast tunable burst mode receiver (which can be extended into more); two wavelengths serve as data channels in the entire network, one wavelength serves as a control channel, and a node A is a master node. The technical characteristics of the OBTN will be briefly described as follows:

(1) The most basic transmission unit in the data channel is the OB. A guard time existing between the OBs serves as an interval, one or a plurality of OBs form a data frame, initial positions of corresponding OB frames and OB slots of different wavelength channels need to be aligned. The data channel uses a burst optical receiver/transmitter, burst data are directly transmitted at the optical layer between source and sink node pairs and do not need to be forwarded at the electronic layer by an intermediate node. The source end is required to converge and encapsulate client-side data packets to the OBs to send.

(2) The control channel and the data channel are separated. The OBTN uses an independent wavelength channel to bear control information, including Operations Administration and Maintenance (OAM) information, a bandwidth report used for collecting a bandwidth request of each node and a bandwidth map indicating each node to send/receive data, and a control frame is sent in advance of a corresponding data frame. The control channel can use a common optical receiver/transmitter as the transceiving device, and electric field processing is performed in each node, to receive and update the corresponding control information. A time sequence relationship between the control frame and the data frame is as shown in FIG. 2.

(3) The all-optical switching based on the OB is implemented by using a fast tunable optical device. The OBTN node can fast adjust a transmitting/receiving wavelength of the nanosecond (ns) grade transmitter/receiver, to select corresponding wavelengths and OB timeslots for performing burst data transmitting/receiving according to the bandwidth map, so as to achieve the all-optical switching based on the OB.

(4) The traffic-aware real-time optical layer resource scheduling. The OBTN uses a centralized control mode, each slave node periodically reports a bandwidth request to the master node through the control frame, and the master node allocates the wavelengths and OB timeslots according to the current resource state and a bandwidth allocation policy, and an allocation result is wrote into a bandwidth map, and then is distributed to each slave node by the control frame, to realize the fast optical layer resource scheduling according to the traffic requirements.

However, since the burst data packet is directly transmitted at the optical layer between the source and sink node pairs without going through the electric processing, it is subject to the restriction of wavelength consistency and timeslot consistency. As shown in FIG. 1, one burst data packet sent from the node A to a node D is appointed by the bandwidth map at the node A to be added at the 3rd OB timeslot of the corresponding data frame of the wavelength λ 1; due to the optical-layer direct transmission and no wavelength convertor and optical buffering (the wavelength convertor is high-cost and seriously affects the signal quality; and the optical buffering technology is not broken through), and when it passes through a node B and a node C to drop at the node D, the burst data packet must also occupy the 3rd OB timeslot of the corresponding data frame of the wavelength λ 1, but the wavelength and timeslot position cannot be changed. Furthermore, since the allocation of wavelengths and timeslots is subject to the above multiple restrictions and the bandwidth resources are limited, if the allocation is improper, resource conflicts will be caused, which leads to a large number of packet losses and seriously reduces the network performance. The resource conflicts in the OBTN mainly include the following three kinds:

(1) Transmitter resource conflict. One source end transmitter can and only can send the burst data on one wavelength at arbitrary timeslot position. As shown in the figure, the node A sends an A→D burst data packet at the 3rd OB timeslot of the corresponding data frame of the wavelength λ 1; at this point, if there is also one service with the node A as a source node on the 3rd OB timeslot of the corresponding data frame of the wavelength λ 2 in the bandwidth map, the transmitter resource conflict is generated.

(2) Receiver resource conflict. One destination end receiver can and only can receive the burst data on one wavelength at arbitrary timeslot position. As shown in the figure, the node D receives an A→D burst data packet at the 3rd OB timeslot of the corresponding data frame of the wavelength λ 1; at this point, if there is also one service with the node D as a destination node on the 3rd OB timeslot of the corresponding data frame of the wavelength λ 2 in the bandwidth map, the receiver resource conflict is generated.

(3) Link resource conflict. An arbitrary timeslot of a corresponding data frame of an arbitrary wavelength can and only can be allocated once in the same link. As shown in the figure, a service A→D occupies the 3rd OB timeslot of the corresponding data frame of the wavelength λ 1; at this point, if there is also a service B→A which occupies the 3rd OB timeslot of the corresponding data frame of the wavelength λ 1 in the bandwidth map, then the link resource conflict will be generated in a link BC and a link CD.

SUMMARY OF THE INVENTION

The embodiments of the present document provide a method and device for bandwidth map update, to eliminate a resource conflict in the process of calculating and updating a bandwidth map.

A method for bandwidth map update provided by the embodiments of the present document comprises:

after receiving a bandwidth report carried by a control frame, a master node newly establishing a bandwidth map, newly establishing a resource state table, and setting all resource states in the newly established resource state table to be available;

adding a cross-master node transport channel drop allocation structure of the newly established bandwidth map in accordance with a cross-master node transport channel add allocation structure of a bandwidth map to be updated, and updating the resource state table according to resource occupancy thereof;

according to the bandwidth report carried by the control frame, allocating a wavelength and an optical burst timeslot to a current bandwidth request one by one, adding wavelengths and optical burst timeslots to the newly established bandwidth map, generating a new bandwidth map, and updating the resource state table; and distributing the control frame carrying the new bandwidth map to slave nodes hop by hop.

Preferably, the above method is further characterized in that: the adding the cross-master node transport channel drop allocation structure of the newly established bandwidth map in accordance with the cross-master node transport channel add allocation structure of the bandwidth map to be updated comprises:

traversing the bandwidth map to be updated, and configuring wavelengths and optical burst timeslot positions of the cross-master node transport channel add allocation structure in the bandwidth map to be updated as wavelengths and optical burst timeslot positions of a same transport channel drop allocation structure in the newly established bandwidth map.

Preferably, the above method is further characterized in that: the newly establishing a resource state table comprises:

newly establishing a source/sink resource state table of a current allocation period, a link resource state table of the current allocation period and a sink resource state table of a next allocation period.

Preferably, the above method is further characterized in that:

the source/sink resource state table is an N×I×M three-dimensional matrix table, and represents an available state of an $i^{th}$ transmitter/receiver of a node n at an $m^{th}$ optical burst timeslot position, n=1, 2, . . . , N; i=1, 2, . . . , I; m=1, 2, . . . , M; the N, I and M are all integers greater than 1, the N represents the number of nodes in an Optical Burst Transport Network (OBTN) ring network, the I represents the number of transceivers in a data channel of a node, and the M represents a total number of optical burst timeslots of one data frame;

the link resource state table is an L×W×M three-dimensional matrix table, and represents an available state of a wavelength w in a link l at an $m^{th}$ optical burst timeslot position, l=1, 2, . . . , L; w=1, 2, . . . , W; m=1, 2, . . . , M; the L, W and M are all integers greater than 1, the L represents the number of links, the W represent the number of wavelengths of a data channel, and the M represents the total number of optical burst timeslots of one data frame.

Preferably, the above method is further characterized in that: the updating corresponding state tables comprises:

the updating the resource state table comprises:

for a non-cross-master node service, updating the source/sink resource state table of the current allocation period and the link resource state table of the current allocation period;

for a cross-master node add service, updating the source resource state table of the current allocation period, the current link resource state table and the sink resource state table of the next allocation period; and for a cross-master node drop service, updating the sink resource state table of the current allocation period and the link resource state table of the current allocation period.

Preferably, the above method is further characterized in that: the allocating the wavelengths and optical burst timeslots one by one to the current bandwidth request comprises:

according to a source node identifier and a sink node identifier of the current bandwidth request, orderly querying a source resource state table and a sink resource state table, if the source resource state table and the sink resource state table have consistent available optical burst timeslots, then querying a routing table according to the source node identifier and the sink node identifier of the current bandwidth request, if the routing table has a unselected route, then selecting one route, and querying the link resource state table in accordance with a wavelength sequence according to the selected route, and if links with a same wavelength have consistent available optical burst timeslot resources with a source end and a sink end, then selecting one wavelength and one optical burst timeslot position meeting requirements for allocating.

Preferably, the above method is further characterized in that:

the new bandwidth map carries wavelength and optical burst timeslot configuration information of each burst transport channel, the new bandwidth map is composed of one or more submaps, and each submap comprises one wavelength field and one optical burst timeslot allocation field.

Preferably, the above method is further characterized in that:

the wavelength field consists of a wavelength identifier and the number of optical bursts, a bit mapping mode is used in the optical burst timeslot allocation field, and each bit corresponds to one optical burst timeslot position in a data frame.

Preferably, the above method is further characterized in that: the distributing the control frame carrying the new bandwidth map to slave nodes hop by hop comprises:

performing object coding according to the new bandwidth map, and distributing the control frame carrying the coded new bandwidth map to the slave nodes hop by hop.

In order to solve the above problem, the embodiments of the present document further provide a device for bandwidth map update, which comprises: an initialization module, an allocation module, a generation module, a distribution module and an update module, wherein:

the initialization module is configured to: after receiving a bandwidth report carried by a control frame, newly establish a bandwidth map, newly establish a resource state table, and set all resource states in the newly established resource state table to be available;

the allocation module is configured to: add a cross-master node transport channel drop allocation structure of the newly established bandwidth map in accordance with a cross-master node transport channel add allocation structure of a bandwidth map to be updated, and trigger the update module;

the generation module is configured to: according to the bandwidth report reported by the control frame, allocate a wavelength and an optical burst timeslot to a current bandwidth request one by one, add wavelengths and optical burst timeslots to the newly established bandwidth map, generate a new bandwidth map, and trigger the update module;

the distribution module is configured to: distribute the control frame carrying the new bandwidth map to slave nodes hop by hop; and the update module is configured to: update the resource state table after being triggered.

Preferably, the above device is further characterized in that:

the allocation module is configured to add the cross-master node transport channel drop allocation structure of the newly established bandwidth map in accordance with the cross-master node transport channel add allocation structure of the bandwidth map to be updated by means of: traversing the bandwidth map to be updated, and configuring wavelengths and optical burst timeslot positions of the cross-master node transport channel add allocation structure in the bandwidth map to be updated as wavelengths and optical burst timeslot positions of a same transport channel drop allocation structure in the newly established bandwidth map.

Preferably, the above device is further characterized that:

the initialization module is configured to newly establish the resource state table by means of: newly establishing a source/sink resource state table of a current allocation period, a link resource state table of the current allocation period and a sink resource state table of a next allocation period, wherein, the source/sink resource state table is an N×I×M three-dimensional matrix table, and represents an available state of an $i^{th}$ transmitter/receiver of a node n at an $m^{th}$ optical burst timeslot position, n=1, 2, . . . , N; i=1, 2, . . . , I; m=1, 2, . . . , M; the N, I and M are all integers greater than 1, the N represents the number of nodes in an Optical Burst Transport Network (OBTN) ring network, the I represents the number of transceivers in a data channel of a node, and the M represents a total number of optical burst timeslots of one data frame; the link resource state table is an L×W×M three-dimensional matrix table, and represents an available state of a wavelength w in a link l at an $m^{th}$ optical burst timeslot position, l=1, 2, . . . , L; w=1, 2, . . . , W; m=1, 2, . . . , M; the L, W and M are all integers greater than 1, the L represents the number of links, the W represent the number of wavelengths of a data channel, and the M represents a total number of optical burst timeslots of one data frame.

Preferably, the above device is further characterized in that:

the update module is configured to update the corresponding resource state table by means of: for a non-cross-master node service, updating the source/sink resource state table of the current allocation period and the link resource state table of the current allocation period; for a cross-master node add service, updating the source resource state table of the current allocation period, the link resource state table of the current allocation period and the sink resource state table of the next allocation period; and for a cross-master node drop service, updating the sink resource state table of the current allocation period and the link resource state table of the current allocation period.

Preferably, the above device is further characterized in that:

the generation module is configured to allocate the wavelengths and optical burst timeslots one by one to the current bandwidth request by means of: according to a source node identifier and a sink node identifier of the current bandwidth request, orderly querying a source resource state table and a sink resource state table, if the source resource state table and the sink resource state table have consistent available optical burst timeslots, then querying a routing table according to the source node identifier and the sink node identifier of the current bandwidth request, if the routing table has a unselected route, then selecting one route, and querying the link resource state table in accordance with a wavelength sequence according to the selected route, and if links with a same wavelength have consistent available optical burst timeslot resources with a source end and a sink end, then selecting one wavelength and one optical burst timeslot position meeting requirements for allocating.

Preferably, the above device is further characterized in that:

the new bandwidth map generated by the generation module carries wavelength and optical burst timeslot configuration information of each burst transport channel, the new bandwidth map is composed of one or more submaps, each submap comprises one wavelength field and one optical burst timeslot allocation field, the wavelength field consists of a wavelength identifier and the number of optical bursts, a bit mapping mode is used in the optical burst timeslot allocation field, and each bit corresponds to one optical burst timeslot position in a data frame.

Preferably, the above device is further characterized in that:

the distribution module is configured to perform object coding according to the new bandwidth map, and distribute the control frame carrying the coded new bandwidth map to the slave nodes hop by hop.

The embodiments of the present document further provide a computer program, comprising program instructions, wherein, when the program instructions are executed by a master node, the master node can execute the above method.

The embodiments of the present document further provide a carrier carrying the above computer program.

In conclusion, the embodiments of the present document provide a method and device for bandwidth map update, in the ORIN network, the resource conflict is eliminated in the process of calculating and updating a bandwidth map, and while achieving the dynamic bandwidth allocation between arbitrary node pairs, the packet loss rate can be reduced and the network service bearing capacity can be improved.

BRIEF DESCRIPTION OF DRAWINGS

FIG. 3 is a schematic diagram of an example of a source/sink resource state table according to an embodiment of the present document;

FIG. 4 is a schematic diagram of an example of a link resource state table according to an embodiment of the present document;

FIG. 5 is a schematic diagram of an example of a routing table according to an embodiment of the present document;

FIG. 6 is a flow chart of a method for bandwidth map update according to an embodiment of the present document;

FIG. 9a to FIG. 9d are schematic diagrams of bandwidth map update according to an embodiment of the present document;

PREFERRED EMBODIMENTS OF THE INVENTION

The OBTN has an advantage of all-optical sub-wavelength switching, but the "storage-forwarding" mode of a traditional electric layer packet device cannot be used for reference by the OBTN due to immature technologies of optical buffering and wavelength conversion, thereby the possibility of resource conflict increases greatly, and a large number of packet losses may be caused. Therefore, it is necessary to consider the resource conflict problem at the stage of calculating the bandwidth map to avoid the resource conflict and enhance the efficiency of the OBTN network through a reasonable wavelength and timeslot resource allocation in combination with a corresponding method for bandwidth map update; meanwhile, the OBTN network needs to realize fast resource scheduling, so the complexity of the wavelength and timeslot allocation algorithm must be reasonable, in order to meet real-time requirements. However, that problem is not considered in all current documents and patents related to the OBTN.

The embodiments of the present document will be described in detail in combination with the accompanying drawings below. It should be noted that embodiments in the present document and the features in various embodiments can be arbitrarily combined with each other in the case of no conflict.

In the embodiments of the present document, the requirement on an OBTN networking scenario is: supporting ring topology networking, which can be single-fiber uni-directional or two-fiber bi-directional or multi-fiber bi-directional.

In the embodiments of the present document, the requirement on the OBTN node structure is that: nodes in the network can be configured with one or more pairs of data channel transceivers according to the traffic requirements, and the data channel transceivers may use three modes: a. a Fast Tunable Burst Mode Transmitter (FT-BMT)+a common receiver; b. a common transmitter+a Fast Tunable Burst Mode Receiver (FT-MIR); c. a FT-BMT+a FT-BMR.

Figure 1:
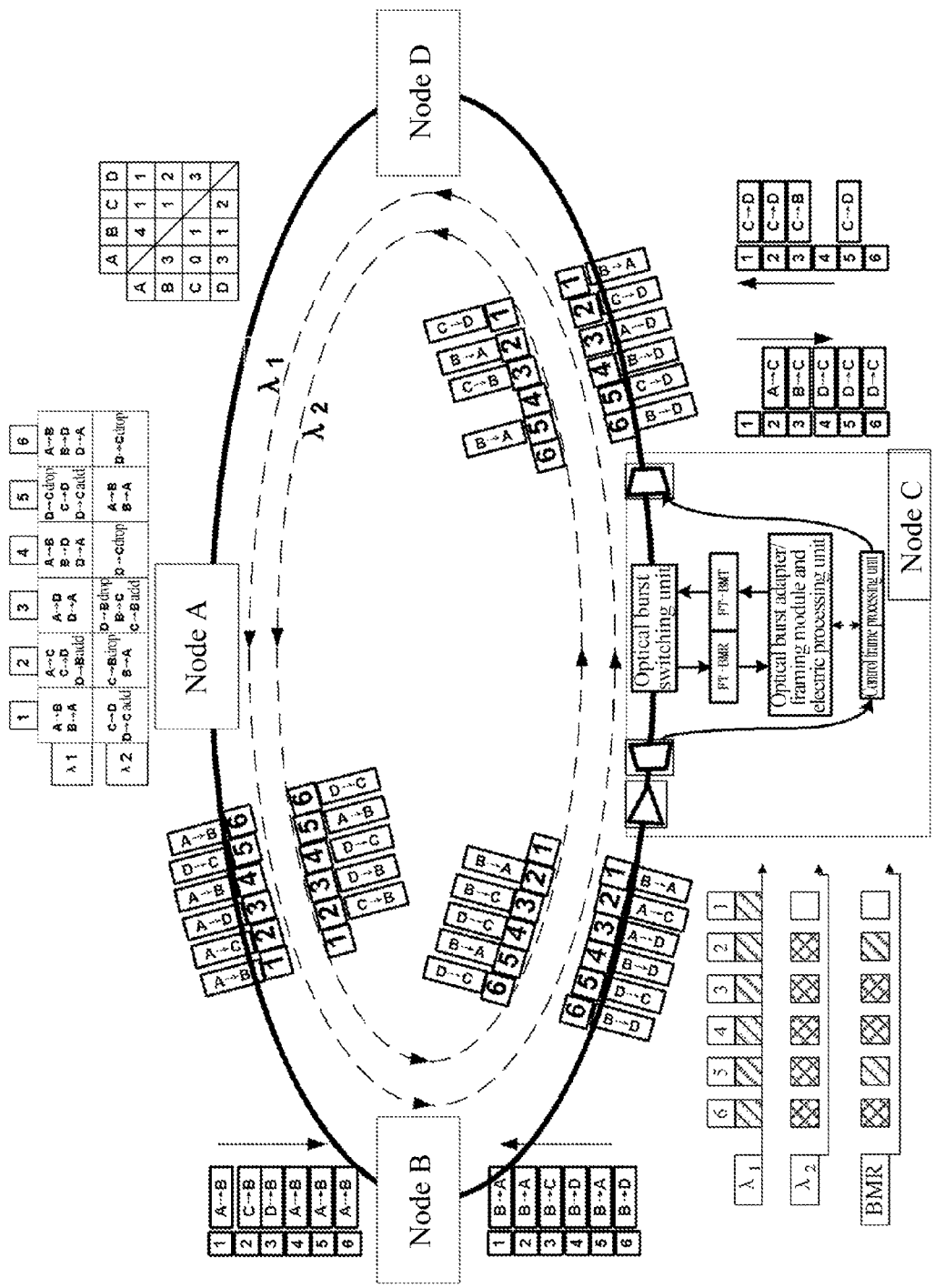
FIG. 1 is a schematic diagram of a basic structure of an OBTN ring network.

FIG. 1 is a diagram of a basic structure of an OBTN unidirectional ring network, and a network scenario thereof is as follows:

1) The network topology is a 4-node unidirectional ring network, a node A is a master node, and other nodes are slave nodes;

2) A pair of fast tunable burst transmitter/receiver is configured for each node in a data channel, and a pair of common transmitter/receiver is configured in a control channel;

3) Two wavelengths are configured in the data channel of the ring network, and one wavelength is configured in the control channel;

4) A data frame contains 10 OB timeslots, and the data ring length of the ring network is 4 times longer than the length of the data frame;

5) A control frame is generated by the master node and updated by the slave nodes, and is transferred along the ring for one circle and terminated at the master node;

6) One data frame executes a DBA (dynamic bandwidth allocation) algorithm once.

In order to describe the contents of the present document in detail, it is mainly to make example descriptions with respect to the scenario in FIG. 1, but besides that scenario, the present document is also suitable to any unidirectional/bi-directional OBTN ring network scenarios, and for simpler star and tree topologies, the contents of the embodiments of the present document can be simplified for applicable.

The bandwidth map update in FIG. 1 is mainly divided into following four stages:

1) Bandwidth request reporting:

The control frame carries a bandwidth report to the master node, and the master node receives and quantizes the bandwidth report into an OB timeslot request of each node;

2) Bandwidth map allocation:

According to the current resource state and the bandwidth request, the master node executes the DBA algorithm, performs wavelength and timeslot allocation, and generates anew bandwidth map;

3) Bandwidth map distribution:

The control frame carries the bandwidth map, and is sent to the slave nodes hop by hop in advance of the corresponding data frame, and each slave node receives the control frame and generates an add map and a drop map of the current node; and meanwhile, the control frame collects the bandwidth request from each slave node.

4) Bandwidth map update and execution:

After receiving the control frame, the slave node makes the new bandwidth map come into effect after delaying for a period of time according to a relative time delay between the control frame and the data frame.

FIG. 9a to FIG. 9d are examples of the bandwidth map update with respect to the network scenario in FIG. 1, and the detailed flow is as follows:

When the master node receives the bandwidth report of the control frame and enters the process of calculating the bandwidth map, firstly the master node executes the bandwidth map updates, and as shown in FIG. 6, the following steps are included:

In step 101: after receiving a bandwidth report reported in the control frame, the master node newly establishes a bandwidth map, newly establishes a corresponding resource state table, and sets all resource states in the newly established table to be available;

The master node newly establishes an unallocated bandwidth map which is called as a new bandwidth map; newly establishes a source/sink resource state tables and a link resource state table of the current allocation period; newly establishes a sink resource state table of the next allocation period which is called a next period sink resource state table for short; and resource states are set as available.

The master node newly establishes the new bandwidth map and the above three tables in the case that the master node receives the control frame carrying the bandwidth report, enters the process of calculating the bandwidth map and performs an initialization at the first step.

Figure 9A:
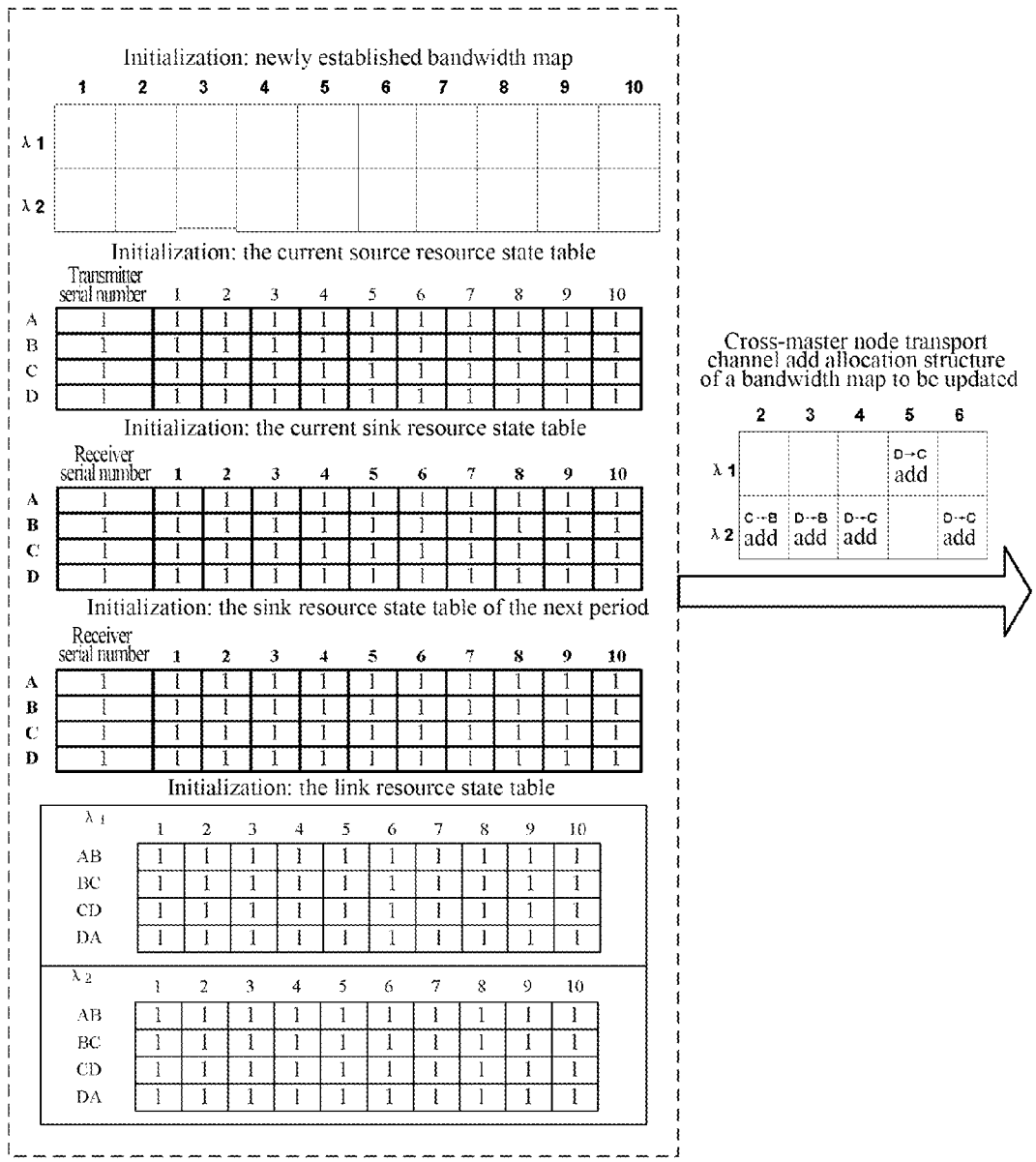

In the embodiment, as shown in FIG. 9a, according to a network configuration, 2 wavelengths and 10 OB timeslots are contained; the source/sink resource state tables of the current allocation period and the next period sink resource state table are initialized. In the present embodiment, the next period sink resource state table represents a sink resource state table (because an OB timeslot allocated by a cross-mater node add service in the current bandwidth map will pass through the master node and be considered as an OB timeslot allocated by a cross-mater node drop service of the bandwidth map of the next period, and occupy sink drop resources corresponding to the data frame of the next period) and a link resource state table of the 4th data frame after the current data frame corresponding to the current bandwidth map, and all resource states in the table are set as 1 which indicate that the resources are not occupied.

In step 102: a cross-master node transport channel drop allocation structure of the new bandwidth map is added in accordance with a cross-master node transport channel add allocation structure of a bandwidth map to be updated, and a sink resource state table and a link resource state table of the current allocation period are updated according to resource occupancy of the cross-master node transport channel drop allocation structure of the new bandwidth map;

The master node traverses the bandwidth map to be updated namely the old bandwidth map, and configures wavelength and OB timeslot positions of the cross-master node transport channel add allocation structure in the bandwidth map to be updated as wavelength and timeslot positions of the drop allocation structure of the same transport channel in the new bandwidth map, and updates the sink resource state table of the current allocation period and the link resource state table of the current allocation period in the meantime.

The OB timeslots allocated for the cross-mater node transport channel add services of the old bandwidth map occupy the corresponding link and sink drop resources within an effectiveness period of the new bandwidth map after passing through the master node, which can be seen as the OB timeslots allocated for the cross-mater node transport channel drop services of the new bandwidth map, therefore, it is required to traverse the old bandwidth map, and to "configure the wavelength and OB timeslot positions of the cross-master node transport channel add allocation structure in the old bandwidth map as the wavelength and timeslot positions of the drop allocation structure of the same transport channel in the new bandwidth map".

In the bandwidth map to be updated, the cross-master node transport channel add allocation structure includes: D→C add path of the wavelength 1, the $5^{th}$ OB, C→B add path of the wavelength 2, the $2^{nd}$ OB timeslot, D→B add path of the wavelength 2, the $3^{rd}$ OB timeslot, D→C add path of the wavelength 2, the $4^{th}$ OB timeslot, and add path of the wavelength 2, the $6^{th}$ OB timeslot.

The cross-master node transport channel add allocation structure is converted into the cross-master node transport channel drop allocation structure of the new bandwidth map, including: D→C drop path of the wavelength 1, the $5^{th}$ OB timeslot, C→B drop path of the wavelength 2, the $2^{nd}$ timeslot, D→B drop path of the wavelength 2, the $3^{rd}$ OB timeslot, D→C drop path of the wavelength 2, the $4^{th}$ OB timeslot, and D→C drop path of the wavelength 2, the $6^{th}$ OB timeslot.

Figure 9B:

Meanwhile, the sink resource state table and the link resource state table of the current allocation period are updated according to the resource occupancy state of the cross-master node transport channel drop allocation structure. For example, the D→C drop path of the wavelength 1, the $5^{th}$ OB timeslot needs to occupy the drop resources of the node C of the $5^{th}$ OB timeslot and timeslot resources of the links AB and BC at the wavelength 1, the $5^{th}$ OB timeslot, thus those resources are set as 0 to identify that the resources are unavailable, and thereafter the resources will not be selected in the wavelength and timeslot allocation process. Eventually the update result of the resource state table is as shown in FIG. 9b.

In the embodiment, the bandwidth map to be updated represents a bandwidth map corresponding to the $4^{th}$ data frame before the current data frame, for the OB timeslot allocated for the cross-mater node add service of the bandwidth map to be updated will pass through the master node and be considered as the OB timeslot allocated for the cross-mater node drop service of the current bandwidth map, and occupy sink drop resources corresponding to the current data frame. Since a mutual influence exists between the bandwidth map of the former period and the bandwidth map of the later period, in this embodiment, the master node is required to save at least 4 bandwidth maps.

In step 103: according to the bandwidth report reported by the control frame, a wavelength and an OB timeslot are allocated to a current bandwidth request one by one and added to the new bandwidth map, and the corresponding state tables are updated.

For a non-cross-master node service, it is required to update the source/sink resource state tables and the link resource state table of the current allocation period; for a cross-master node add service, it is required to update the source resource state table and the link resource state table of the current allocation period and the next period sink resource state table; and for a cross-master node drop service, update the current sink resource state table and the link resource state table of the current allocation period.

In the embodiment, the quantization is performed to the bandwidth request and the wavelength and the OB timeslot are allocated for the bandwidth request, and the corresponding resource state table is updated.

For example, the A→C requests for allocating one OB timeslot, then the $2^{nd}$ OB timeslot of the wavelength 1 is allocated for the A→C through the state table query and the wavelength and timeslot allocation algorithm, and the resource occupancy thereof is as follows: add resources of the $2^{nd}$ OB timeslot of the node A, drop resources of the $2^{nd}$ OB timeslot of the node C, and timeslot resources of the links AB and BC at the $2^{nd}$ OB timeslot of the wavelength 1. The corresponding positions are set as 0 in the resource table, to avoid the conflict caused by reuse.

For another example, the C→B add path requests for allocating one OB timeslot, then the $3^{rd}$ OB timeslot of the wavelength 2 is allocated to the C→B add through the state table query and the wavelength and timeslot allocation algorithm, and the resource occupancy thereof is as follows: add resources of the $3^{rd}$ OB timeslot of the node c, drop resources of the $3^{rd}$ OB timeslot of the node B at the next period, and timeslot resources of the links CD and DA at the $3^{rd}$ OB timeslot of the wavelength 2. The corresponding positions are set as 0 in the resource table. It should be noted that the routing of the C→B passes through the master node, thus only add resources of the current allocation period of the node C and timeslot resources of the links CD and DA are occupied, but the occupancy of drop resources of the node B and timeslot resources of the link AB is reflected in the bandwidth map of the next allocation period. The bandwidth map and the resource state table are eventually shown in FIG. 9c.

In step 104, the master node distributes the control frame carrying the new bandwidth map to the slave nodes hop by hop.

The establishment of the new bandwidth map is completed and saved in the master node, and a bandwidth map object is generated according to a coding scheme of the bandwidth map and carried by the control frame to be distributed to the slave nodes hop by hop.

The bandwidth map needs to be carried in the control frame and transmitted to the slave nodes, so as to guide the slave nodes to add/drop which services at which wavelengths and timeslots. Therefore, the bandwidth map is required to have identical and standardized coding schemes, to facilitate the master node coding, the control frame carrying and the slave nodes identifying.

Figure 2:
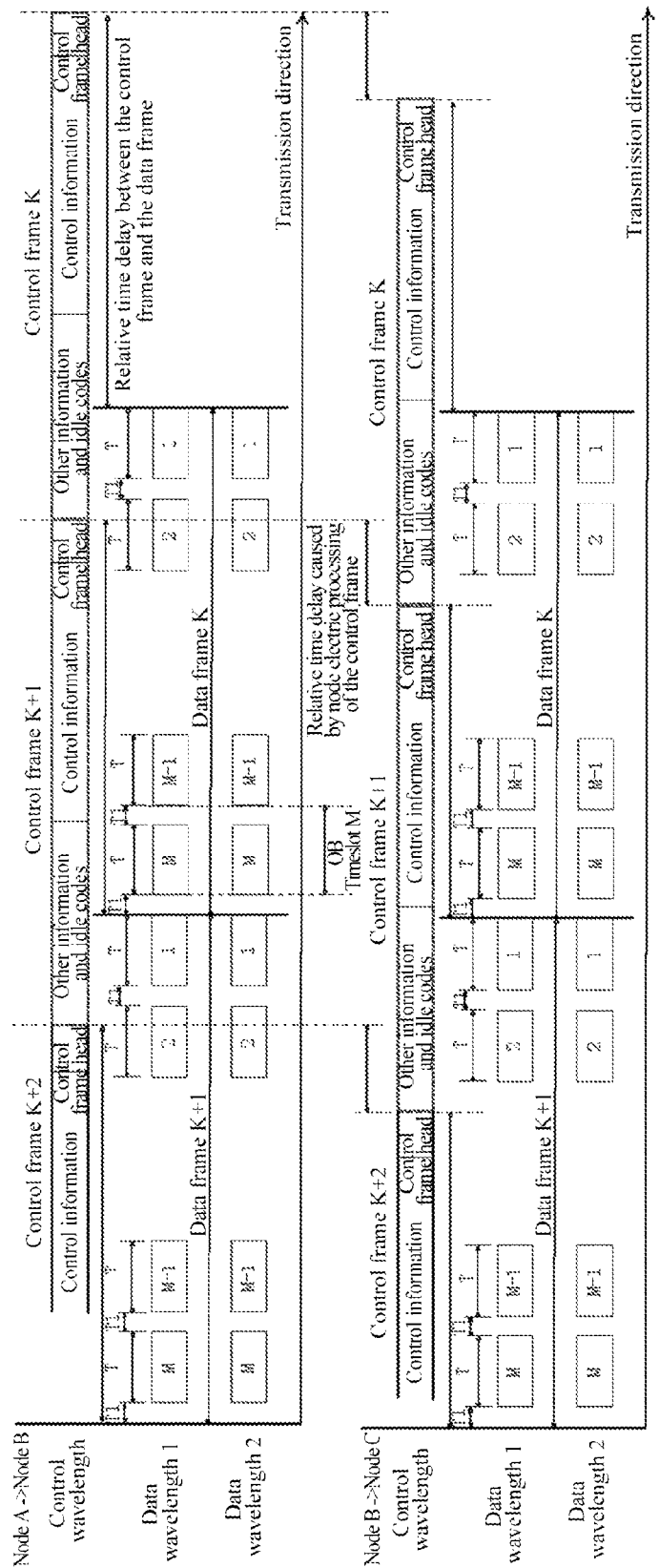
FIG. 2 is a schematic diagram of a relative time sequence of a control frame and a data frame in an OWEN ring network.

In the embodiment, the bandwidth map object is encoded and carried in the control frame to the slave nodes, and a time sequence of the control frame and the data frame is shown in FIG. 2; the slave node, according to the bandwidth map, generates a transmitting wavelength timeslot table and a receiving wavelength timeslot table, as shown in FIG. 1, which come into effect after a certain time delay (the time delay of a node is determined through measurement and carried in the control frame, and an implementation mechanism thereof is not within the discussion scope of the present patent), in order to control the data transmission and receiving of the node.

For example, the D→C drop path occupies 3 OB timeslots in total in the current bandwidth map, which are respectively the $5^{th}$ timeslot of the wavelength 1 reflected as 0x0010 (the $5^{th}$ bit is set) in the OB timeslot allocation coding of the corresponding BTC (burst transport channel) overhead, and the $4^{th}$ timeslot and $6^{th}$ timeslot of the wavelength 2 reflected as 0x0028 (the $4^{th}$ bit and $6^{th}$ bit are set) in the OB timeslot allocation coding. Since the D→C drop path belongs to the cross-master node transport channel drop allocation structure in the current bandwidth map and only performs receiving within the effectiveness scope of the current bandwidth map, the add bit is set as 0 and the drop bit is set as 1; the cross-master node transport channel drop allocation structure does not carry the bandwidth report; and a source node of the BTC is indicated in the BMS (burst multiplex section) to which the source node belongs.

For example, the A→C belongs to a non-cross-master node transport channel in the current bandwidth map, and performs transmission and receiving within the effectiveness scope of the current bandwidth map, thus both the add bit and the drop bit are set as 1; the BTC overhead with the master node as the source node is not required to carry the bandwidth report, and the bandwidth report can be directly obtained through local reading.

For another example, the C→B add path belongs to the cross-master node transport channel add allocation structure in the current bandwidth map and only performs transmission within the effectiveness scope of the current bandwidth map, thus only the add bit is set as 1; the bandwidth report may be carried therein, but the bandwidth map generated by the master node does not include the bandwidth report, while the control frame carries the bandwidth report to the slave nodes, the slave node adds the bandwidth report into the BTC overhead corresponding to the control frame and reports it, as shown in FIG. 9d.

In the embodiments of the present document, it is required to use the following state tables: source/sink resource state tables, a link resource state table and a routing table:

the source/sink resource state table is an N×I×M three-dimensional matrix, wherein, the N represents the number of nodes in an OBTN ring network, the I represents the number of transceivers in the data channel of the node, and the M represents the total number of OB timeslots of one data frame. The source/sink resource state table represents an available state of the $i^{th}$ transmitter/receiver of the node n at the $m^{th}$ OB timeslot position, 1 represents resources available, and 0 represents resources occupied. The N, I and M are all integers greater than 1, n=1, 2, ..., N; i=1, 2, ..., I; m=1, 2, ..., M.

The link resource state table is an L×W×M three-dimensional matrix, wherein, the L represents the number of links, the W represents the number of wavelengths of the data channel, and the M represents the total number of OB timeslots of one data frame. The link resource state table represents an available state of the wavelength w in the link l at the $m^{th}$ OB timeslot position, 1 represents resources available, and 0 represents resources occupied. The L, W and M are all integers greater than 1, l=1, 2, ..., L; w=1, 2, ..., W; m=1, 2, ..., M.

The source/sink resource state table and the link resource state table can be represented by means of bit mapping, to save the space and improve the computation efficiency.

The routing table is a N×N×P×L four-dimensional matrix, wherein, the N represents the number of nodes in the OBTN ring network, the P represents the number of routes of the node pair (s, d), and the L represents the number of links, With regard to a unidirectional ring network, a value is 1; and with regard to obi-directional ring network, a value is 2. The routing table represents whether the $p^{th}$ route from the node s to the node d passes the link l, 1 represents passing, and 0 represents not passing on the contrary. The N, P, L are all integers greater than 1, n=1, 2, ..., N; p=1, 2, ..., P; l=1, ..., L.

FIG. 3, FIG. 4 and FIG. 5 are respectively examples of the source/sink resource state table, the link resource state table and the routing table with respect to the scenario in FIG. 1 in the embodiment.

The innovation points and advantages of the method for bandwidth map update in the embodiment are summarized as follows: (1) through the resource state tables, the resource occupancy of the cross-master node transport channel at the period of the current bandwidth map and the resource occupancy of the currently allocated transport channel can be effectively identified, so that the resource conflict will not be generated during the wavelength and timeslot allocation, and thus the resource conflict also will not occur in the generated bandwidth map; (2) the method for bandwidth map update considers the problem of resource conflict in the wavelength and timeslot allocation process, thus the network bearing capability can be effectively enhanced, and the resource utilization rate is high; however, in the existing method for bandwidth map update, it is to adopt that the conflict is detected after the bandwidth map is generated, and the allocated transport channel related to the conflict resources in the bandwidth map is canceled to avoid the conflict, which causes that the bandwidth allocation is unstable, the resource utilization rate is low, and it is difficult to guarantee the network performance.

Figure 7:
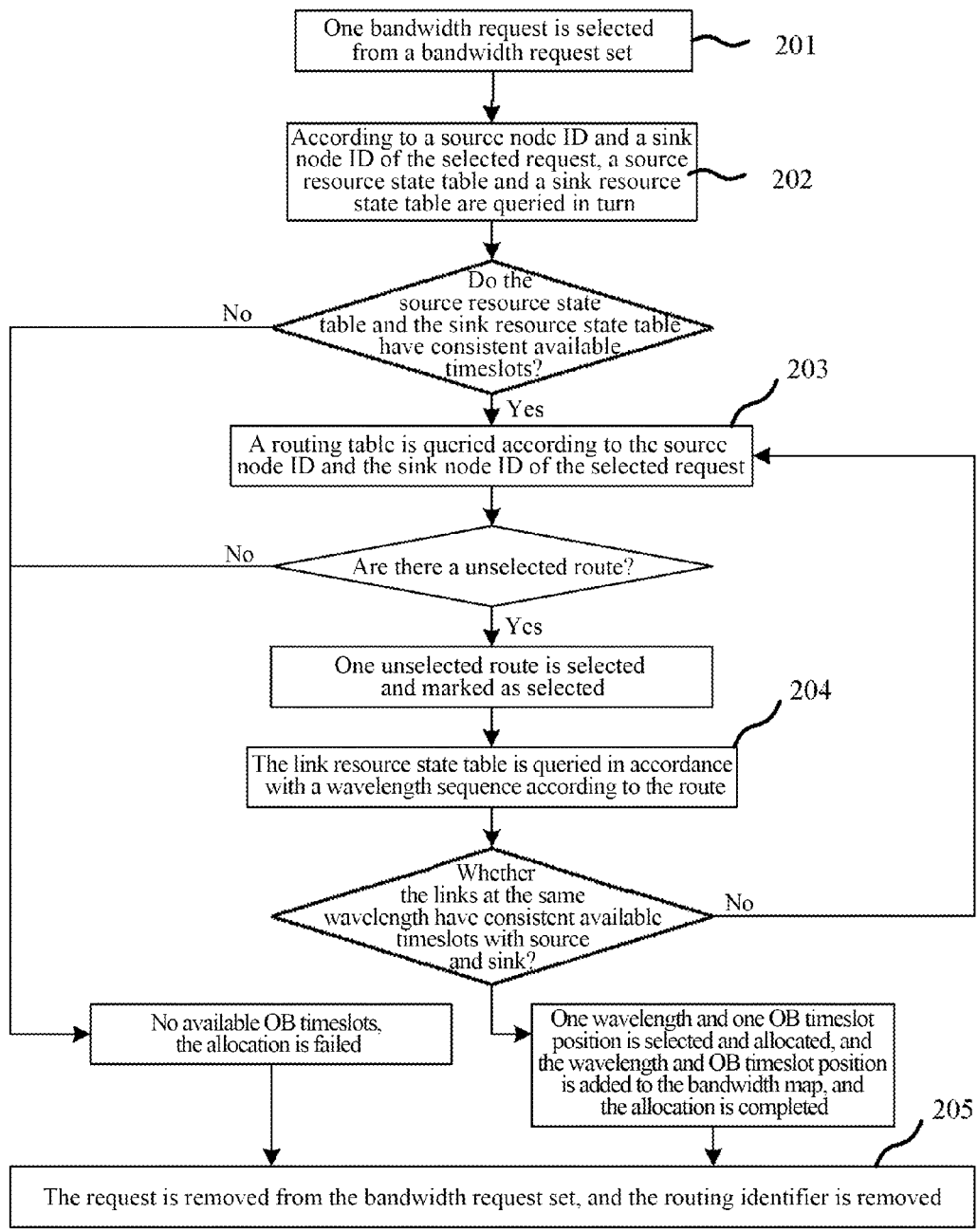
FIG. 7 is a flow chart of a method for wavelength and timeslot allocation according to an embodiment of the present document.

The wavelength and OB timeslot allocation method based on the state tables in the embodiment is shown in FIG. 7, and the following steps are included:

In step 201: one bandwidth request is selected from a bandwidth request set;

The specific selection algorithm and fairness guarantee mechanism are not within the discussion scope of the present document.

In step 202: according to a source node ID and a sink node ID of the selected request, a source resource state table and a sink resource state table are queried in turn;

For a non-cross-master node service, the source resource state table and the sink resource state table of the current allocation period are queried, and for a cross-master node service, the source resource state table of the current allocation period and the sink resource state table of the next allocation period are queried. If the source resource state table and the sink resource state table have consistent available OB timeslots, it proceeds to step 203; and if the source resource state table and the sink resource state table do not have consistent available timeslots after the state tables are traversed, the allocation is failed, and it proceeds to step 205.

In step 203: a routing table is queried according to the source node ID and the sink node ID of the selected request, if there is an unselected route, the route is selected and marked as selected, and it proceeds to step 204; and if all routes have been traversed, and the allocation is not completed, it proceeds to step 205.

In step 204: the link resource state table is queried in accordance with a wavelength sequence according to the route, if the link has consistent available OB timeslot resources with the source end and the sink end at the same wavelength, one wavelength and one OB timeslot position which meet requirements is selected and allocated, and the wavelength and the OB timeslot position is added to the bandwidth map, and the allocation is completed; and if there is no consistent OB timeslot position after all wavelengths are traversed, it proceeds to the step 203.

In step 205: the request is removed from the bandwidth request set, and the wavelength and OB timeslot allocation is failed.

Figure 9C:
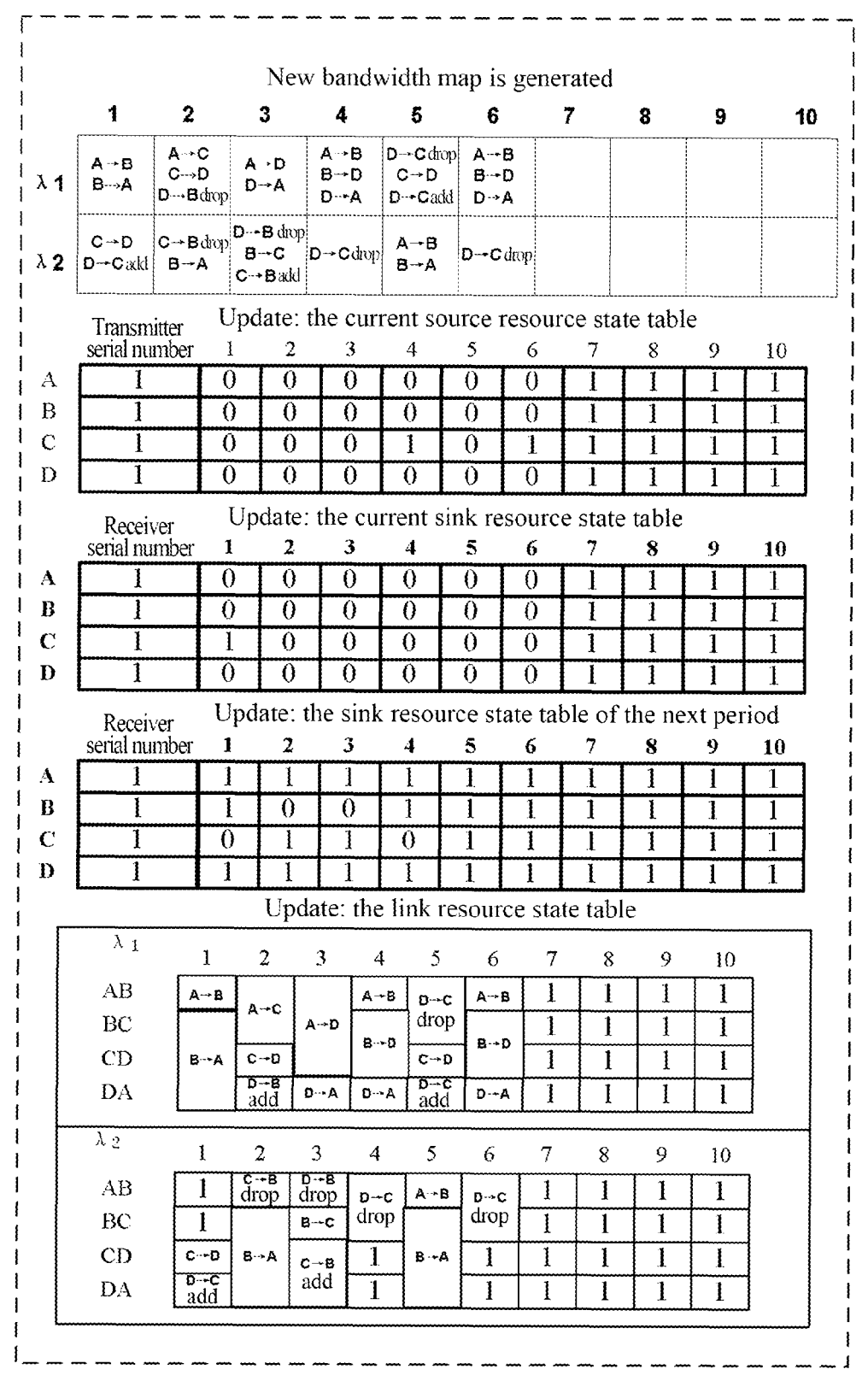
Figure 10A:
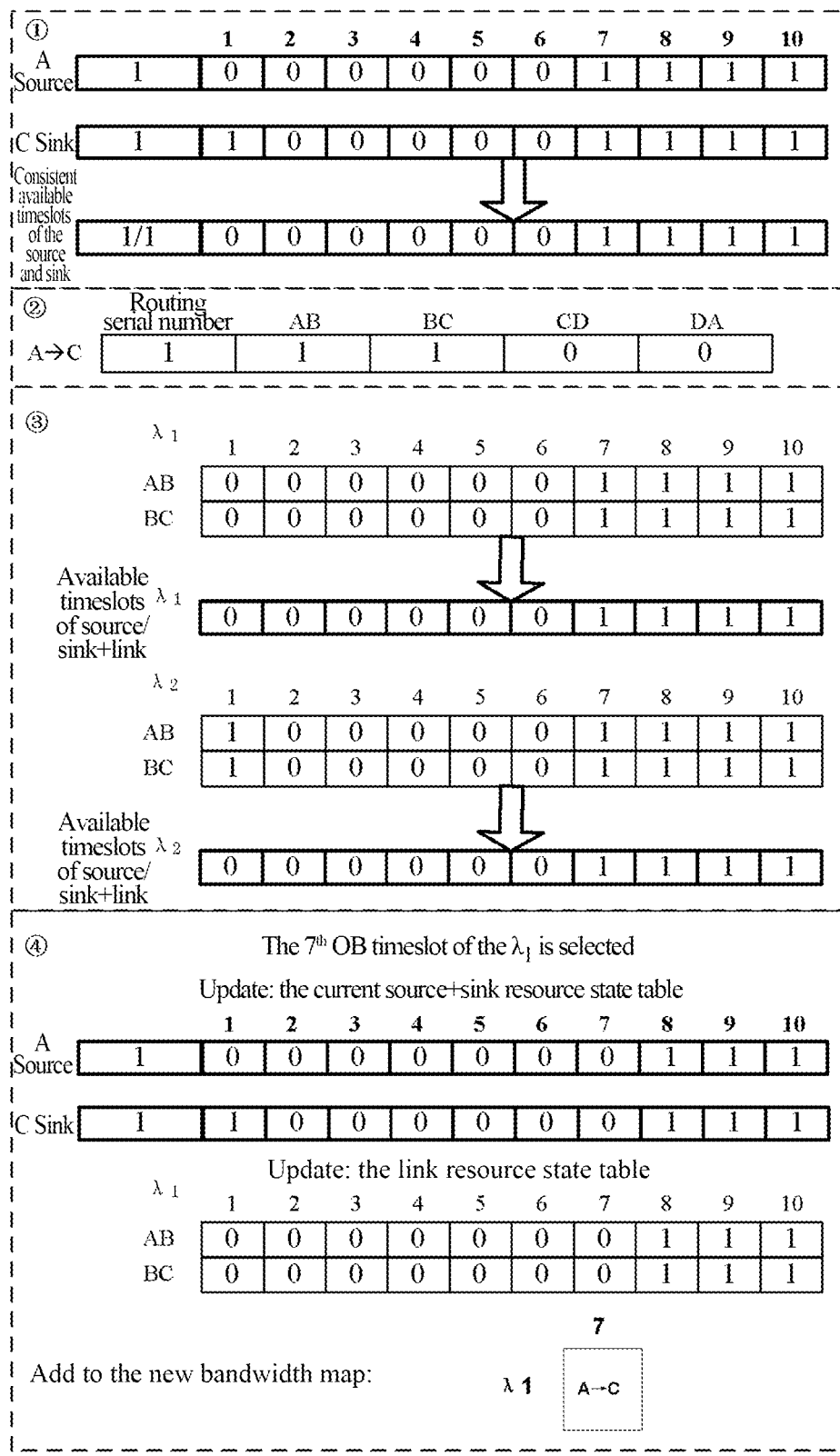
FIG. 10a is an example diagram of wavelength and OB timeslot allocation of an A→C with respect to a network scenario in FIG. 1.
Figure 10B:
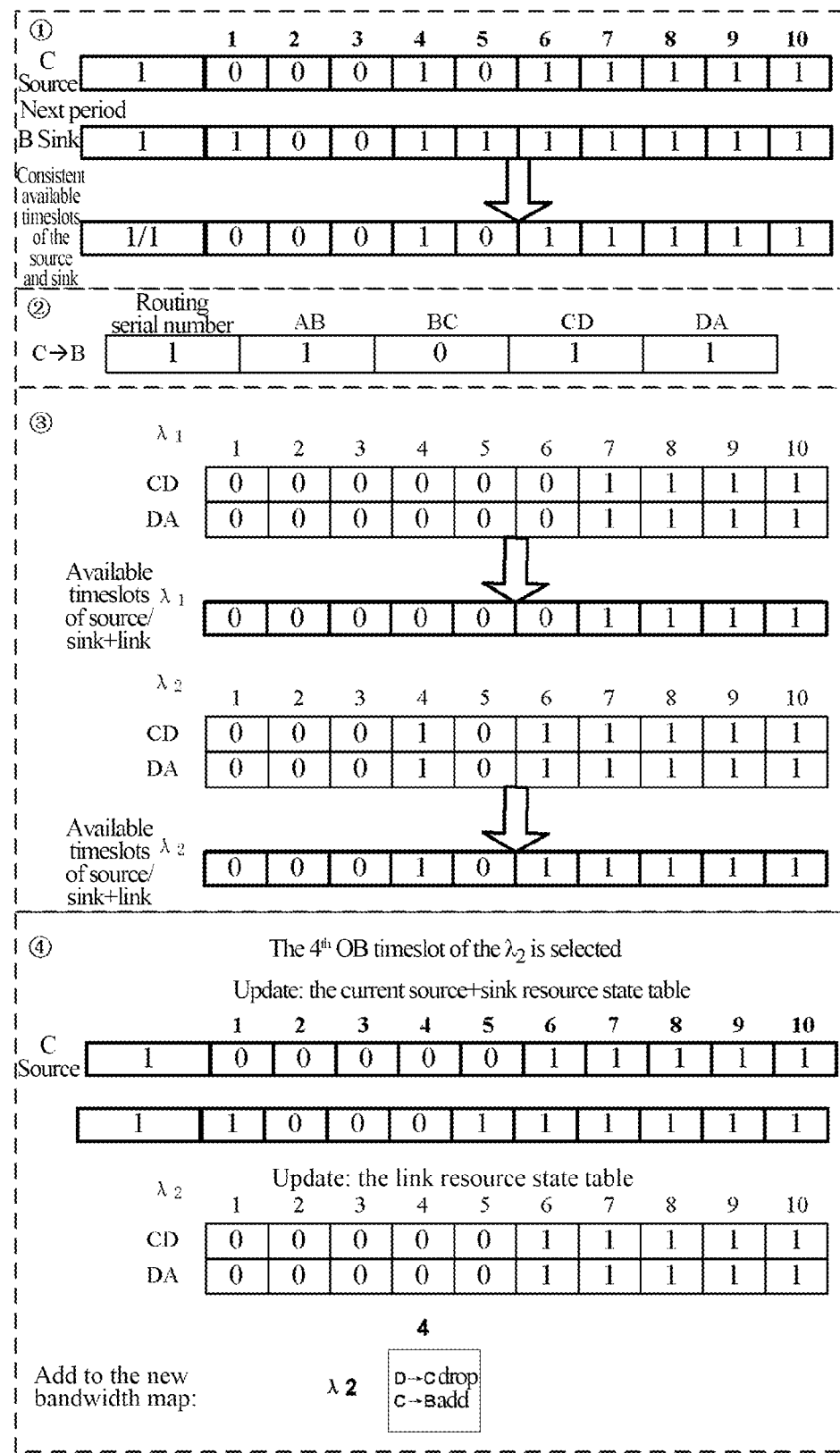
FIG. 10b is an example diagram of wavelength and OB timeslot allocation of a C→B with respect to a network scenario in FIG. 1.

FIG. 10a is an example diagram of the wavelength and OB timeslot allocation of the A→C with respect to the network scenario in FIG. 1, and FIG. 10b is an example diagram of the wavelength and OB timeslot allocation of the C→B with respect to the network scenario in FIG. 1. Here it is assumed that the A→C and C→B add paths still respectively request one OB timeslot after the bandwidth map update in FIG. 9c is executed, and the wavelength and timeslot allocation method will be described through a specific process below:

with regard to the non-cross-master node service A→C, as shown in FIG. 10a, the allocation steps are as follows:

(1) the source resource state table of the current allocation period of the former node A and the sink resource state table of the current allocation period of the node C are searched to acquire a consistent available timeslot set: timeslots 7~10 (if the bit mapping mode is adopted, a result can be obtained simply by using and operation, the efficiency is very high and the timeliness can be ensured);

(2) the routing table is queried to acquire that the unique route (unidirectional ring network) of the A→C passes through the links AB and BC;

(3) the resource state tables of the link AB and the link BC are searched to acquire consistent available timeslot sets of various wavelengths of the source and sink and the links: timeslots 7~10 of the wavelength 1 and timeslots 7~10 of the wavelength 2;

(4) according to the algorithm policy, one wavelength and one OB time slot are selected from the available set and allocated: in the embodiment, the $7^{th}$ OB timeslot of the wavelength 1 is allocated. Meanwhile, the $7^{th}$ OB timeslot of the wavelength 1 is added to the bandwidth map, and the source resource state table of the current allocation period of the node A, the sink resource state table of the current allocation period of the node C and the resource state tables of the links AB and BC at the wavelength 1 are updated.

For the cross-master node add service C→B, as shown in FIG. 10b, the allocation steps are as follows:

(1) the source resource state table of the current allocation period of the node C and the sink resource state table of the next allocation period of the node B are searched to acquire consistent available timeslot sets: timeslot 4 and timeslots 6~10;

(2) the routing table is queried to acquire that the unique route (unidirectional ring network) of the C→B passes through the links CD, DA and AB;

(3) the resource state tables of the link CD and the link DA are searched (only link resources of the CD and the DA are occupied within the effectiveness scope of the current bandwidth map, and the resource occupancy of the link AB is reflected in the next period after passing through the master node), to acquire consistent available timeslot sets of various wavelengths of the source and sink and the links: timeslots 7~10 of the wavelength 1 and timeslot 4 and timeslots 6~10 of the wavelength 2;

(4) according to the algorithm policy, one wavelength and one OB time slot are selected from the available set and allocated: in the embodiment, the $4^{th}$ OB timeslot of the wavelength 2 is allocated. Meanwhile, the $4^{th}$ OB timeslot of the wavelength 2 is added to the bandwidth map, and the source resource state table of the current allocation period of the node C, the sink resource state table of the next allocation period of the node B and the resource state tables of the links CD and DA at the wavelength 2 are updated.

The innovation points and advantages of the wavelength and timeslot allocation method in the embodiment are as follows: (1) the bit mapping mode can be used in the resource state tables, which can effectively reduce the storage space demands; (2) only simple table lookup and and/or operation are required in the wavelength and timeslot allocation method based on the state tables, which has low complexity, conforms to the requirements of real-time calculation and fast resource scheduling, and is applicable to hardware implementation; (3) the wavelength and timeslot allocation method in the embodiment is suitable to all the three OBTN node structures; (4) there is no related patents and documents to solve the problem at present.

Figure 8:
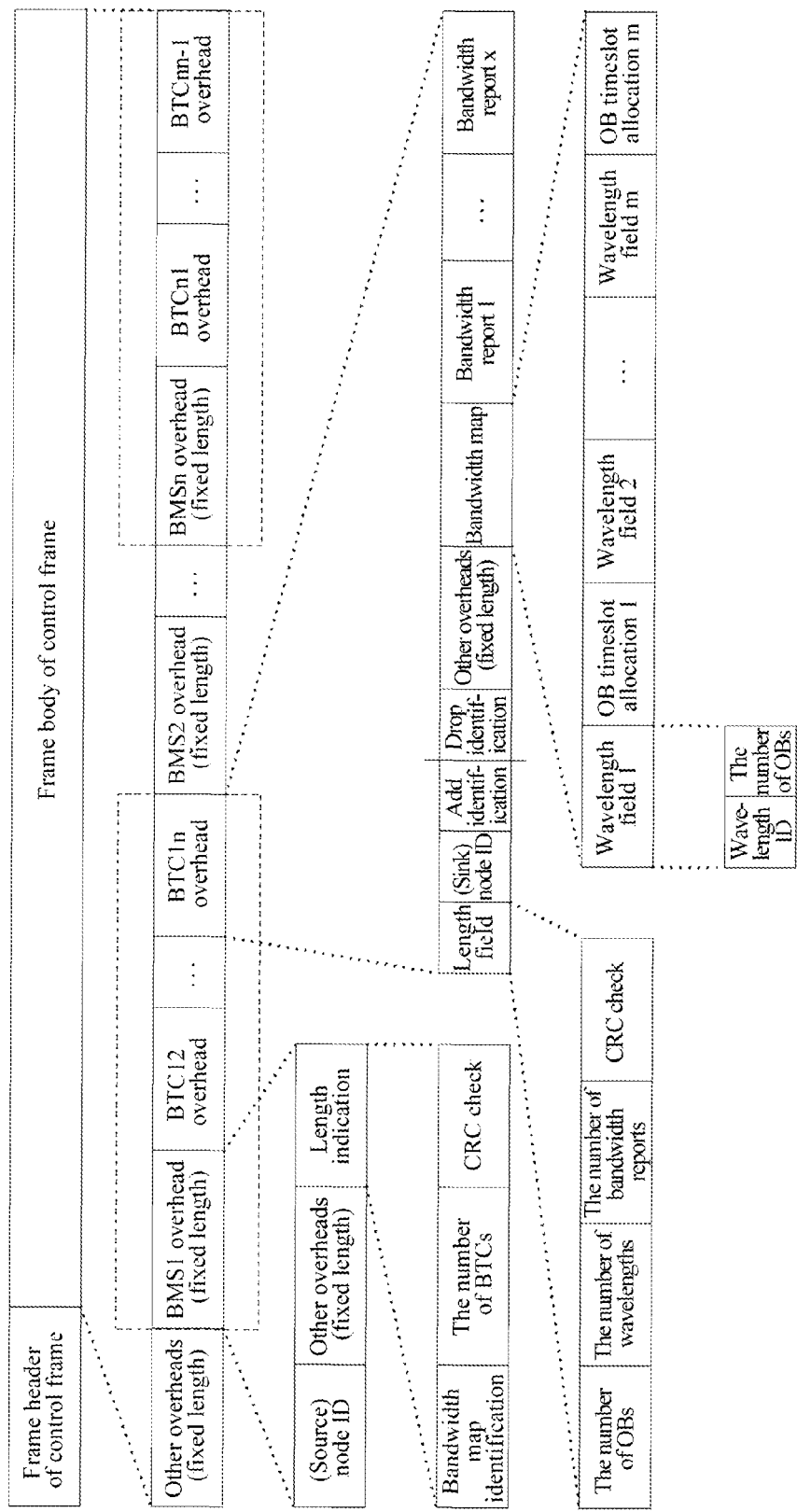
FIG. 8 is a schematic diagram of object coding of a bandwidth map according to an embodiment of the present document.

The object coding structure of the bandwidth map of the control frame in the embodiment is shown in FIG. 8. Only the coding structure related to the bandwidth map is concerned in the present document, and other object structures of the control frame will not be expanded in detail.

The burst multiplex section (BMS) overhead is used for appointing one node (a source node) and carrying the OAM overhead related to the node. The BMS overhead mainly includes three parts: a source node ID, the node OAM overhead and a length indication, wherein the length indication is composed of three parts: the identification with or without the bandwidth map, the number of burst transport channels (BTCs) and the CRC check. The number of BTCs represents the total number of BTCs with the node ID in the BMS as the source node, and the bandwidth map identification indicates whether the BTCs carry the bandwidth map, With regard to an n-node optical burst ring network, the control frame includes the overhead of n burst multiplex sections (BMS).

The burst transport channel (BTC) overhead is used for carrying the OAM overhead, bandwidth map configuration information and bandwidth report information of one BTC. The burst transport channel (BTC) overhead includes a length field, a sink node ID, an add/drop path identifier, a bandwidth map, a bandwidth report and other overheads related to the burst transport channel. The length field consists of the number of OBs, the number of wavelengths, the number of bandwidth reports and the CRC check; wherein the number of OBs and the number of wavelengths respectively represent the total number of OB timeslots and the number of wavelengths allocated to the BTC in the bandwidth map, so that the length of the bandwidth map can be determined; the number of bandwidth reports represents the total number of bandwidth reports carried by the BTC, so that the length of the bandwidth report can be determined. The sink node ID is used to indicate a sink node of the BTC. The add path identifier and the drop path identifier respectively represent whether the BTC is in the add path and the drop path of the period of the control frame. The combination of the sink node ID, the add path identifier and the drop path identifier in the BTC and the source node ID in the BMS can uniquely identify one BTC.

The bandwidth map is used to carry the wavelength and OB timeslot configuration information of each BTC. One bandwidth map is composed of one or more submaps, and each submap contains one wavelength field and one OB timeslot allocation field. The wavelength field consists of a wavelength ID and the number of OBs, wherein the wavelength ID uniquely identify a serial number of the allocated wavelength, the number of OBs represents the number of OBs allocated on the wavelength. The bit mapping mode is used in the OB timeslot allocation field, and each bit corresponds to one OB timeslot position in a data frame, if the corresponding OB timeslot is allocated to the BTC, it is set as 1, and if the corresponding OB timeslot is not allocated to the BTC, it is set as 0.

The innovation points and advantages of the object coding structure of the bandwidth map of the control frame in the present embodiment are as follows: (1) the control frame uses the two-layer organization mode of burst transport multiplex section+burst transport channel, which can be applicable to all the three OBTN node structures; (2) the bit mapping mode is used in the wavelength and timeslot configuration information in the bandwidth map, which can effectively decrease the length of the control frame and reduce the overhead of the control frame.

Figure 11:
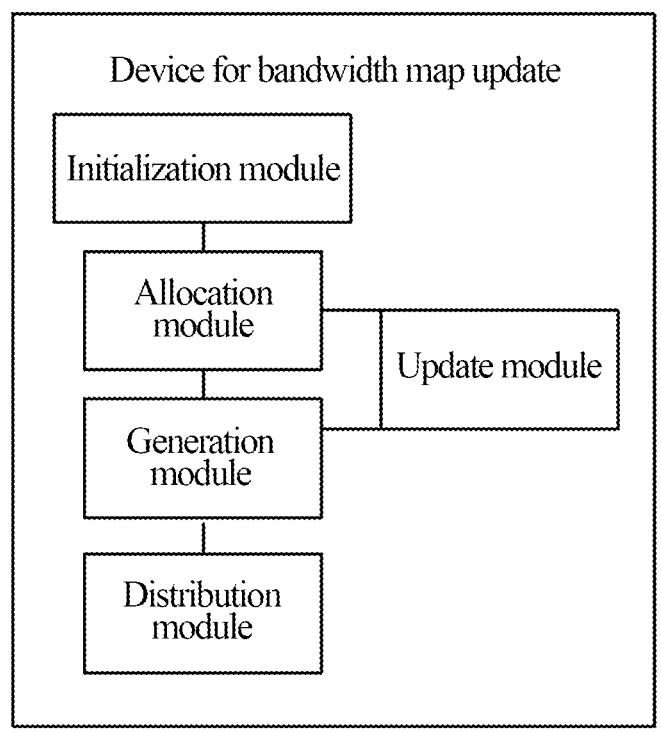
FIG. 11 is a schematic diagram of a device for bandwidth map update according to an embodiment of the present document.

FIG. 11 is a schematic diagram of a device for bandwidth map update according to an embodiment of the present document, and as shown in FIG. 11, the device of the present embodiment contains:

an initialization module, configured to: after receiving a bandwidth report reported by a control frame, newly establish a bandwidth map, newly establish a corresponding resource state table, and set all resource states in the newly established table to be available;

an allocation module, configured to: add a cross-master node transport channel drop allocation structure of the newly established bandwidth map in accordance with a cross-master node transport channel add allocation structure of a bandwidth map to be updated, and trigger an update module;

a generation module, configured to: according to the bandwidth report reported by the control frame, allocate a wavelength and an optical burst timeslot to the current bandwidth request one by one, add wavelengths and optical burst timeslots to the newly established bandwidth map, generate a new bandwidth map, and trigger the update module;

a distribution module, configured to: distribute the control frame carrying the new bandwidth map to slave nodes hop by hop; and the update module, configured to: update the corresponding resource state table a being triggered.

Wherein, the allocation module adding the cross-master node transport channel drop allocation structure of the newly established bandwidth map in accordance with the cross-master node transport channel add allocation structure of the bandwidth map to be updated includes: traversing the bandwidth map to be updated, and configuring wavelengths sand optical burst timeslot positions of the cross-master node transport channel add allocation structure in the bandwidth map to be updated as wavelength and optical burst timeslot positions of the same transport channel drop allocation structure in the newly established bandwidth map.

Wherein, the initialization module newly establishing the corresponding resource state table includes: newly establishing a source/sink resource state table of the current allocation period, a link resource state table of the current allocation period and a sink resource state table of the next allocation period, wherein, the source/sink resource state table is a three-dimensional matrix table, and represents an available state of the $i^{th}$ transmitter/receiver of the node n at the $m^{th}$ optical burst timeslot position; the link resource state table is a three-dimensional matrix table, and represents an available state of the wavelength w in the link l at the $m^{th}$ optical burst timeslot position.

Wherein, the update module updating the corresponding resource state table after being triggered includes: for a non-cross-master node service, updating the source/sink resource state table of the current allocation period and the link resource state table of the current allocation period; for a cross-master node add service, updating the source resource state table of the current allocation period, the link resource state table of the current allocation period and the sink resource state table of the next allocation period; and for a cross-master node drop service, updating the sink resource state table of the current allocation period and the link resource state table of the current allocation period.

Wherein, the generation module allocating the wavelengths and optical burst timeslots one by one to the current bandwidth request includes: according to a source node identifier and a sink node identifier of the current bandwidth request, orderly querying a source resource state table and a sink resource state table, if the source resource state table and the sink resource state table have consistent available optical burst timeslots, then querying a routing table according to the source node identifier and the sink node identifier of the current bandwidth request, if the routing table has a unselected route, then selecting one route, and querying the link resource state table in accordance with a wavelength sequence according to the selected route, and if links with a same wavelength have consistent available optical burst timeslot resources with a source end and a sink end, then selecting one wavelength and one optical burst timeslot position meeting requirements for allocating.

Wherein, the new bandwidth map generated by the generation module carries wavelength and optical burst timeslot configuration information of each burst transport channel, the new bandwidth map is composed of one or more submaps, each submap contains one wavelength field and one optical burst timeslot allocation field, the wavelength field consists of a wavelength identifier and the number of optical bursts, a bit mapping mode is used in the optical burst timeslot allocation field, and each bit corresponds to one optical burst timeslot position in a data frame.

Wherein, the distribution module is configured to perform object coding according to the new bandwidth map, and distribute the control frame carrying the coded new bandwidth map to the slave nodes hop by hop.

The generation module generates a complete new bandwidth map according to the wavelength and timeslot allocation result and the initialized new bandwidth map. Since the state tables have reflected the cross-master node resource occupancy situation in the wavelength and OB timeslot allocation process, no resource conflict exist in the new bandwidth map.

The embodiments of the present document also provide a computer program, including program instructions, when the program instructions are executed by a master node, the master node is enabled to execute the method of the embodiments of the present document.

The embodiments of the present document also provide a carrier carrying the above computer program.

The ordinary person skilled in the art can understand that all or part of the steps in the above method can be completed by a program instructing related hardware, and the program can be stored in a computer readable memory medium, such as a read-only memory, magnetic disk or optical disk and so on. Alternatively, all or part of the steps of the above embodiments also can be implemented by using one or multiple integrated circuits (using an FPGA or ASIC chip). Correspondingly, each module/unit in the above embodiments can be implemented in a form of hardware, and also can be implemented in a form of software function module. The present document is not limited to any combination of hardware and software in a specific form.

The above description is only the preferred embodiments of the present document. Certainly, the present-document can still have other various embodiments, the skilled people familiar to the art can make various corresponding changes and transformations according to the present document without departing from the spirit and essence of the present document and these corresponding changes and transformations shall all fall into the protection scope of the appended claims of the present document.

INDUSTRIAL APPLICABILITY

In the embodiments of the present document, a resource conflict can be eliminated in the process of calculating and updating a bandwidth map, and while achieving the dynamic bandwidth allocation between arbitrary node pairs, the packet loss rate can be reduced and the network service bearing capacity can be improved.

What is claimed is:

1. A method for bandwidth map update, comprising:
after receiving a bandwidth report carried by a control frame, a master node newly establishing a bandwidth map, newly establishing a resource state table, and setting all resource states in the newly established resource state table to be available;
adding a cross-master node transport channel drop allocation structure of the newly established bandwidth map in accordance with a cross-master node transport channel add allocation structure of a bandwidth map to be updated, and updating the resource state table according to resource occupancy thereof;
according to the bandwidth report carried by the control frame, allocating a wavelength and an optical burst timeslot to a current bandwidth request one by one, adding wavelengths and optical burst timeslots to the newly established bandwidth map, generating a new bandwidth map, and updating the resource state table; and
distributing the control frame carrying the new bandwidth map to slave nodes hop by hop;
wherein the allocating the wavelengths and optical burst timeslots one by one to the current bandwidth request comprises:

according to a source node identifier and a sink node identifier of the current bandwidth request, orderly querying a source resource state table and a sink resource state table, if the source resource state table and the sink resource state table have consistent available optical burst timeslots, then querying a routing table according to the source node identifier and the sink node identifier of the current bandwidth request, if the routing table has a unselected route, then selecting one route, and querying the link resource state table in accordance with a wavelength sequence according to the selected route, and if links with a same wavelength have consistent available optical burst timeslot resources with a source end and a sink end, then selecting one wavelength and one optical burst timeslot position meeting requirements for allocating.

2. The method of claim 1, wherein, the adding the cross-master node transport channel drop allocation structure of the newly established bandwidth map in accordance with the cross-master node transport channel add allocation structure of the bandwidth map to be updated comprises:

traversing the bandwidth map to be updated, and configuring wavelengths and optical burst timeslot positions of the cross-master node transport channel add allocation structure in the bandwidth map to be updated as wavelengths and optical burst timeslot positions of a same transport channel drop allocation structure in the newly established bandwidth map.

3. The method of claim 1, wherein, the newly establishing a resource state table comprises:

newly establishing a source/sink resource state table of a current allocation period, a link resource state table of the current allocation period and a sink resource state table of a next allocation period.

4. The method of claim 3, wherein, the source/sink resource state table is an N×I×M three-dimensional matrix table, and represents an available state of an $i^{th}$ transmitter/receiver of a node n at an $m^{th}$ optical burst timeslot position, n=1, 2, ..., N; i=1, 2, ..., I; m=1, 2, ..., M; the N, I and M are all integers greater than 1, the N represents the number of nodes in an Optical Burst Transport Network (OBTN) ring network, the I represents the number of transceivers in a data channel of a node, and the M represents a total number of optical burst timeslots of one data frame;

the link resource state table is an L×W×M three-dimensional matrix table, and represents an available state of a wavelength w in a link l at an $m^{th}$ optical burst timeslot position, l=1, 2, ..., L; w=1, 2, ..., W; m=1, 2, ..., M; the L, W and M are all integers greater than 1, the L represents the number of links, the W represent the number of wavelengths of a data channel, and the M represents the total number of optical burst timeslots of one data frame.

5. The method of claim 3, wherein, the updating the resource state table comprises:

for a non-cross-master node service, updating the source/sink resource state table of the current allocation period and the link resource state table of the current allocation period;

for a cross-master node add service, updating the source resource state table of the current allocation period, the current link resource state table and the sink resource state table of the next allocation period; and for a cross-master node drop service, updating the sink resource state table of the current allocation period and the link resource state table of the current allocation period.

6. The method of claim 1, wherein, the new bandwidth map carries wavelength and optical burst timeslot configuration information of each burst transport channel, the new bandwidth map is composed of one or more submaps, and each submap comprises one wavelength field and one optical burst timeslot allocation field.

7. The method of claim 6, wherein, the wavelength field consists of a wavelength identifier and the number of optical bursts, a bit mapping mode is used in the optical burst timeslot allocation field, and each bit corresponds to one optical burst timeslot position in a data frame.

8. The method of claim 1, wherein, the distributing the control frame carrying the new bandwidth map to slave nodes hop by hop comprises:

performing object coding according to the new bandwidth map, and distributing the control frame carrying the coded new bandwidth map to the slave nodes hop by hop.

9. A device for bandwidth map update, comprising an initialization module, an allocation module, a generation module, a distribution module and an update module, wherein:

the initialization module is configured to: after receiving a bandwidth report carried by a control frame, newly establish a bandwidth map, newly establish a resource state table, and set all resource states in the newly established resource state table to be available;

the allocation module is configured to: add a cross-master node transport channel drop allocation structure of the newly established bandwidth map in accordance with a cross-master node transport channel add allocation structure of a bandwidth map to be updated, and trigger the update module;

the generation module is configured to: according to the bandwidth report reported by the control frame, allocate a wavelength and an optical burst timeslot to a current bandwidth request one by one, add wavelengths and optical burst timeslots to the newly established bandwidth map, generate a new bandwidth map, and trigger the update module;

the distribution module is configured to: distribute the control frame carrying the new bandwidth map to slave nodes hop by hop; and the update module is configured to: update the resource state table after being triggered;

wherein the generation module is configured to allocate the wavelengths and optical burst timeslots one by one to the current bandwidth request by means of: according to a source node identifier and a sink node identifier of the current bandwidth request, orderly querying a source resource state table and a sink resource state table, if the source resource state table and the sink resource state table have consistent available optical burst timeslots, then querying a routing table according to the source node identifier and the sink node identifier of the current bandwidth request, if the routing table has a unselected route, then selecting one route, and querying the link resource state table in accordance with a wavelength sequence according to the selected route, and if links with a same wavelength have consistent available optical burst timeslot resources with a source end and a sink end, then selecting one wavelength and one optical burst timeslot position meeting requirements for allocating.

10. The device of claim 9, wherein,
the allocation module is configured to add the cross-master node transport channel drop allocation structure of the newly established bandwidth map in accordance with the cross-master node transport channel add allocation structure of the bandwidth map to be updated by means of: traversing the bandwidth map to be updated, and configuring wavelengths and optical burst timeslot positions of the cross-master node transport channel add allocation structure in the bandwidth map to be updated as wavelengths and optical burst timeslot positions of a same transport channel drop allocation structure in the newly established bandwidth map.

11. The device of claim 9, wherein,
the initialization module is configured to newly establish the resource state table by means of: newly establishing a source/sink resource state table of a current allocation period, a link resource state table of the current allocation period and a sink resource state table of a next allocation period, wherein, the source/sink resource state table is an N×I×M three-dimensional matrix table, and represents an available state of an $i^{th}$ transmitter/receiver of a node n at an $m^{th}$ optical burst timeslot position, n=1, 2, . . . , N; i=1, 2, . . . , I; m=1, 2, . . . , M; the N, I and M are all integers greater than 1, the N represents the number of nodes in an Optical Burst Transport Network (OBTN) ring network, the I represents the number of transceivers in a data channel of a node, and the M represents a total number of optical burst timeslots of one data frame; the link resource state table is an L×W×M three-dimensional matrix table, and represents an available state of a wavelength w in a link l at an $m^{th}$ optical burst timeslot position, l=1, 2, . . . , L; w=1, 2, . . . , W; m=1, 2, . . . , M; the L, W and M are all integers greater than 1, the L represents the number of links, the W represent the number of wavelengths of a data channel, and the M represents a total number of optical burst timeslots of one data frame.

12. The device of claim 11, wherein,
the update module is configured to update the corresponding resource state table by means of: for a non-cross-master node service, updating the source/sink resource state table of the current allocation period and the link resource state table of the current allocation period; for a cross-master node add service, updating the source resource state table of the current allocation period, the link resource state table of the current allocation period and the sink resource state table of the next allocation period; and for a cross-master node drop service, updating the sink resource state table of the current allocation period and the link resource state table of the current allocation period.

13. The device of claim 9, wherein,
the new bandwidth map generated by the generation module carries wavelength and optical burst timeslot configuration information of each burst transport channel, the new bandwidth map is composed of one or more submaps, each submap comprises one wavelength field and one optical burst timeslot allocation field, the wavelength field consists of a wavelength identifier and the number of optical bursts, a bit mapping mode is used in the optical burst timeslot allocation field, and each bit corresponds to one optical burst timeslot position in a data frame.

14. The device of claim 9, wherein,
the distribution module is configured to perform object coding according to the new bandwidth map, and distribute the control frame carrying the coded new bandwidth map to the slave nodes hop by hop.

15. A non-transitory computer readable medium comprising: program instructions, wherein, when the program instructions are executed by a master node, the master node can execute the method of claim 1.

16. A non-transitory hardware carrier carrying the program instructions of claim 15.

17. The method of claim 2, wherein,
the new bandwidth map carries wavelength and optical burst timeslot configuration information of each burst transport channel, the new bandwidth map is composed of one or more submaps, and each submap comprises one wavelength field and one optical burst timeslot allocation field.

18. The device of claim 10, wherein,
the new bandwidth map generated by the generation module carries wavelength and optical burst timeslot configuration information of each burst transport channel, the new bandwidth map is composed of one or more submaps, each submap comprises one wavelength field and one optical burst timeslot allocation field, the wavelength field consists of a wavelength identifier and the number of optical bursts, a bit mapping mode is used in the optical burst timeslot allocation field, and each bit corresponds to one optical burst timeslot position in a data frame.

* * * * *